United States Patent
Narahari et al.

(10) Patent No.: US 10,248,540 B2
(45) Date of Patent: Apr. 2, 2019

(54) BIFURCATING A MULTILAYERED COMPUTER PROGRAM PRODUCT

(71) Applicant: International Business Machines Corporation, Armonk, NY (US)

(72) Inventors: Shilpa M. Narahari, Bangalore (IN); Shunmugaraja Periadurai, Chennai (IN); Pragya Singh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/401,671

(22) Filed: Jan. 9, 2017

(65) Prior Publication Data

US 2018/0196737 A1   Jul. 12, 2018

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
CPC .................................................. G06F 11/3688
USPC ......................................................... 717/125
See application file for complete search history.

(56) References Cited

U.S. PATENT DOCUMENTS

| | | | |
|---|---|---|---|
| 6,986,125 B2 | 1/2006 | Apuzzo et al. | |
| 7,003,781 B1 | 2/2006 | Blackwell et al. | |
| 7,096,458 B2 * | 8/2006 | Bates | G06F 11/3476 714/38.13 |
| 8,448,137 B2 | 5/2013 | Kaetker et al. | |
| 8,572,548 B2 | 10/2013 | Tung et al. | |
| 8,713,554 B1 | 4/2014 | Chopra et al. | |
| 9,772,837 B2 | 9/2017 | Kalidindi et al. | |
| 2006/0075391 A1 | 4/2006 | Esmonde, Jr. et al. | |
| 2012/0233599 A1 * | 9/2012 | Valdiviezo Basauri | G06F 8/41 717/126 |
| 2014/0337822 A1 * | 11/2014 | Puthuff | G06F 11/3636 717/125 |
| 2014/0380280 A1 * | 12/2014 | Millwood | G06F 11/366 717/127 |
| 2017/0277534 A1 | 9/2017 | Mallisetty et al. | |
| 2018/0046562 A1 * | 2/2018 | Yu | G06F 11/362 |

* cited by examiner

*Primary Examiner* — Wei Y Zhen
*Assistant Examiner* — Clint Thatcher
(74) *Attorney, Agent, or Firm* — Cantor Colburn LLP; Anthony Curro

(57) ABSTRACT

Technical solutions are described for debugging a computer program product. An example computer-implemented method includes receiving an identifier of a portion of code from a first module of the computer program product, wherein the portion of code contains a defect. The method further includes displaying a list of execution scenarios that invoke the portion of code from the first module. The method further includes, in response to receipt of a selection of a first execution scenario from the list of execution scenarios, executing the computer program product according to the first execution scenario.

20 Claims, 11 Drawing Sheets

| Development Team | Module Name Identification | API Name Identification |
|---|---|---|
| Core Team - Admin Module Team | <myorg>.core.facade.struct <myorg>.core.facade.intf <myorg>.core.extra | <myorg>.core.facade.struct.OrganisationStructureDetails <myorg>.core.facade.intf.Organization |
| Provider Management Team | <myorg>.provider.facade.intf <myorg>.provider.facade.struct <myorg>.provider.service.entity.struct <myorg>.provider.facade.extra | <myorg>.provider.facade.intf.ServiceOfferingManagement <myorg>.provider.facade.struct.DynamicRulesInfo <myorg>.provider.sl.entity.struct.StaticRulesInfo <myorg>.provider.facade.struct.ServiceRateDetails |
| Provider Management Team | <myorg>.provider.facade.struct | <myorg>.provider.facade.struct.ProviderEnrollmentInformation <myorg>.provider.facade.struct.ProviderEnrollmentDetails |
| Core Team | <myorg>.core.facade.struct <myorg>.core.struct. | <myorg>.core.facade.struct.CreatePerson <myorg>.core.facade.struct.CreateCustomerEngagementInfo <myorg>.core.struct.PersonRegistrationDetails |
| Provider Management Team - Service Delivery Team | <myorg>. provider.facade.intf <myorg>.provider.service.entity.struct | <myorg>.provider.facade.intf.ServiceDelivery <myorg>.provider.service.entity.struct.ServiceDeliveryKey |
| Provider Management Team - Service Delivery Team | <myorg>. provider.facade.intf <myorg>. provider.service.entity.struct | <myorg>.provider.facade.intf.ServiceInvoice <myorg>.provider.service.entity.struct.ServiceInvoiceDetails <myorg>.provider.service.entity.struct.ServiceInvoiceLineItemKey <myorg>.provider.service.entity.struct.ServiceInvoiceLineItemKey <myorg>.provider.service.entity.struct.ServiceInvoiceLineItemKey |
| Core Team - Payments Module Team | <myorg>.core.facade.intf <myorg>.core.facade.intf.extra | <myorg>.core.facade.intf.System |

Fig. 5

| Step | Module Name Identification | API Name Identification |
|---|---|---|
| Create an Organization | <myorg>.core.facade.struct <myorg>.core.facade.intf <myorg>.core.extra | <myorg>.core.facade.struct.OrganisationStructureDetails <myorg>.core.facade.intf.Organization |
| Creation of Service Offering | <myorg>.provider.facade.intf <myorg>.provider.facade.struct <myorg>. provider.service.entity.struct <myorg>.provider.facade.extra | <myorg>.provider.facade.intf. ServiceOfferingManagement <myorg>.provider.facade.struct.DynamicRulesInfo <myorg>.provider.sl.entity.struct.StaticRulesInfo <myorg>.provider.facade.struct.ServiceRateDetails |
| Enrolling a Provider to an Organization | <myorg>.provider.facade.struct | <myorg>.provider.facade.struct.ProviderEnrollmentInformation <myorg>.provider.facade.struct.ProviderEnrollmentDetails |
| Register a person and create a case | <myorg>.core.facade.struct <myorg>.core.struct. | <myorg>.core.facade.struct.CreatePerson <myorg>.core.facade.struct.CreateCustomerEngagementInfo <myorg>.core.struct.PersonRegistrationDetails |
| Submission of Service Delivery | <myorg>. provider.facade.intf <myorg>. provider.service.struct | <myorg>.provider.facade.intf.ServiceDelivery <myorg>.provider.service.struct.ServiceDeliveryKey |
| Create Service Invoice, Service Invoice Line item, Approve it | <myorg>. provider.facade.intf <myorg>. provider.service.entity.struct | <myorg>.provider.facade.intf.ServiceInvoice <myorg>.provider.service.entity.struct.ServiceInvoice Details <myorg>.provider.service.entity.struct.ServiceInvoiceLineItemKey <myorg>.provider.service.entity.struct.ServiceInvoiceLineItemKey |
| Generate Payments through Batch | <myorg>.core.facade.intf <myorg>.core.facade.intf.extra | <myorg>.core.facade.intf.System |

Fig. 6

| Layer Level | Development Team | Module Name Identification | API Name Identification | Data Model Contributors |
|---|---|---|---|---|
| 0 | Core Team - Person Management | <myorg>.core.facade.struct <myorg>.core.facade.intf | <myorg>.core.facade.intf.Citizen | PERSON CITIZEN |
| 1 | Core Team - Case Management | <myorg>.core.case.facade.intf <myorg>.core.case.facade.struct | <myorg>.core.case.facade.intf.CaseDefinition <myorg>.core.case.facade.struct.CustomerEngagementInfo | CASE_DEFINITION CUSTOMER_ENGAGEMENT_INFO |
| 1 | Core Team - Evidence Management | <myorg>.core.evidence.struct <myorg>.core.evidence.facade | <myorg>.core.evidence.Evidence <myorg>.core.evidence.GenericEvidence | EVIDENCE_DEFINITION GENERIC_EVIDENCE EVIDENCE_INFO |
| 1 | Core Team - Case Management | <myorg>.core.case.facade.intf <myorg>.core.case.facade.struct | <myorg>.core.case.facade.intf.CaseDefinition <myorg>.core.case.facade.struct.CustomerEngagementInfo | CUSTOMER_ENGAGEMENT_INFO CASE_DEFINITION |
| 1 | Core Team - Evidence Management | <myorg>.core.evidence.struct <myorg>.core.evidence.facade | <myorg>.core.evidence.Evidence Definition <myorg>.core.evidence.GenericEvidence | EVIDENCE_DEFINITION GENERIC_EVIDENCE EVIDENCE_INFO |
| 2 | Evidence Broker Team | <myorg>.evidenceborker.facade.intf <myorg>.evidenceborker.facade.struct | <myorg>.evidencebroker.facade.intf.EvidenceSharing <myorg>.evidencebroker.sl.intf.EvidenceSharing | EVIDENCE_SHARING_INFO |
| 3 | Requirements Team | <myorg>.requirements.facade.intf <myorg>.requirements.facade.struct | <myorg>.verification.facade.intf.Requirements <myorg>.verification.facade.intt.RequirementsManager | REQUIREMENTS_INFO REQUIREMENTS_EVIDENCE |

Fig. 10

| Step Details | Data Model Contributors | DML Statements | Layer Level | Development Team |
|---|---|---|---|---|
| Register Person | PERSON<br>CITIZEN | PERSON.INSERT<br>CITIZEN.INSERT | 0 | Core Team - Person Management |
| Creation of 'first case' for the person | CASE_DEFINITION<br>CUSTOMER_ENGAGEMENT_INFO | CASE_DEFINITION.INSERT<br>CUSTOMER_ENGAGEMENT_INFO.INSERT | 1 | Core Team - Case Management |
| Creation of evidence for the 'first case' | EVIDENCE_DEFINITION<br>GENERIC_EVIDENCE<br>EVIDENCE_INFO | EVIDENCE_DEFINITION.INSERT<br>GENERIC_EVIDENCE.INSERT<br>EVIDENCE_INFO.INSERT | 1 | Core Team - Evidence Management |
| Creation of 'second case' for the person | CUSTOMER_ENGAGEMENT_INFO<br>CASE_DEFINITION | CUSTOMER_ENGAGEMENT_INFO.INSERT<br>CASE_DEFINITION.INSERT | 1 | Core Team - Case Management |
| Creation of evidence for the 'second case' | EVIDENCE_DEFINITION<br>GENERIC_EVIDENCE<br>EVIDENCE_INFO | EVIDENCE_DEFINITION.INSERT<br>GENERIC_EVIDENCE.INSERT<br>EVIDENCE_INFO.INSERT | 1 | Core Team - Evidence Management |
| Evidence Sharing API - trigger | EVIDENCE_SHARING_INFO | EVIDENCE_SHARING_INFO.INSERT | 2 | Evidence Broker Team |
| Requirements - Adding Proofs for evidences | REQUIREMENTS_INFO<br>REQUIREMENTS_EVIDENCE | REQUIREMENTS_INFO.INSERT<br>REQUIREMENTS_EVIDENCE.INSERT | 3 | Requirements Team |

BIFURCATING A MULTILAYERED COMPUTER PROGRAM PRODUCT

BACKGROUND

The present application relates to computer technology, and more specifically, to facilitating bifurcation of an execution scenario, and debugging of a computer program product that spans multiple programming layers.

A computer program product may include a software that uses a typical layered model. In computing, a layer, sometimes referred to as an abstraction layer or abstraction level, facilitates hiding implementation details of a particular set of functionality from other parts of the computer program product. For example, each layer is a separate module or a separate computer product. Accordingly, the multi-layered computer program product includes a composition of multiple modules/computer program products, each layer separating functionality from the other. Such a multi-layered approach facilitates interoperability and platform independence, as the computer program product can include separate layers (or sub-layers) for respective platforms. One or more layers may be multi-leveled, that is, include multiple layers.

SUMMARY

One or more embodiments for a computer-implemented method for debugging a computer program product are described. An example computer-implemented method includes receiving an identifier of a portion of code from a first module of the computer program product, wherein the portion of code contains a defect. The method further includes displaying a list of execution scenarios that invoke the portion of code from the first module. The method further includes, in response to receipt of a selection of a first execution scenario from the list of execution scenarios, executing the computer program product according to the first execution scenario.

According to one or more embodiments, a system for debugging a computer program product includes a memory and a processor coupled with the memory. The processor receives an identifier of a portion of code from a first module of the computer program product, wherein the portion of code contains a defect. The processor further displays a list of execution scenarios that invoke the portion of code from the first module. The processor further, in response to receipt of a selection of a first execution scenario from the list of execution scenarios, executes the computer program product according to the first execution scenario.

According to one or more embodiments, a computer program product for debugging a software includes a computer readable storage medium, the computer readable storage medium. The computer readable storage medium includes computer executable instructions to receive an identifier of a portion of code from a first module of the software, wherein the portion of code contains a defect. The computer readable storage medium further includes instructions to display a list of execution scenarios that invoke the portion of code from the first module. The computer readable storage medium further includes instructions to, in response to receipt of a selection of a first execution scenario from the list of execution scenarios, execute the software according to the first execution scenario.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

FIG. 5 illustrates example metadata in a repository, in accordance with one or more embodiments.

FIG. 6 illustrates example metadata that maps one or more steps from execution scenarios with remaining metadata of a computer program product, in accordance with one or more embodiments.

FIG. 10 illustrates metadata used for an example execution scenario described herein.

FIG. 11 illustrates further metadata mapping for an example execution scenario described herein.

DETAILED DESCRIPTION

Described here are technical solutions for facilitating debugging a multilayered computer program product, by identifying one or more scenarios and/or sub-scenarios of for execution of the computer program product. The scenarios identified may be identified in response to and by splitting an execution scenario. In one or more examples, the execution scenario that is split, or bifurcated may be one that experiences a defect. The sub-scenarios may be identified according to platform used for executing the sub-scenarios. Alternatively, or in addition, the sub-scenarios may be identified according to one or more project teams that are handling development for the sub-scenarios. For example, the scenarios identified may be represented and aligned to project groups. The execution scenario that experienced the defect is split such into scenarios to identify scenarios that invoke only a predetermined subset of layers (or modules) of the computer program product. The technical solutions herein thus improve a development environment, such as an integrated development environment (IDE) system, such as ECLIPSE™, VISUAL STUDIO™, LAZARUS™, and others. As such, the technical solutions are rooted in and/or tied to computer technology in order to overcome a problem specifically arising in the realm of computers, specifically operating systems.

Typically, in the layered model, computer executable instructions from one layer communicate with those from another layer via one or more application program interfaces (API) to execute an application flow. An application flow may also be referred to as a scenario. An execution of a scenario typically includes execution of one or more instructions from multiple layers. For example, a scenario may originate from one layer of the computer program product and can have dependencies with other layers of the computer program product. If the execution of the scenario experiences a defect, the defect may be in a portion of code (executable instructions) from the layer from which the scenario originated, or in any of the dependency layers. Accordingly, the layer with the defect has to be identified and debugged to identify and further fix/rectify the defect.

Figure 1:
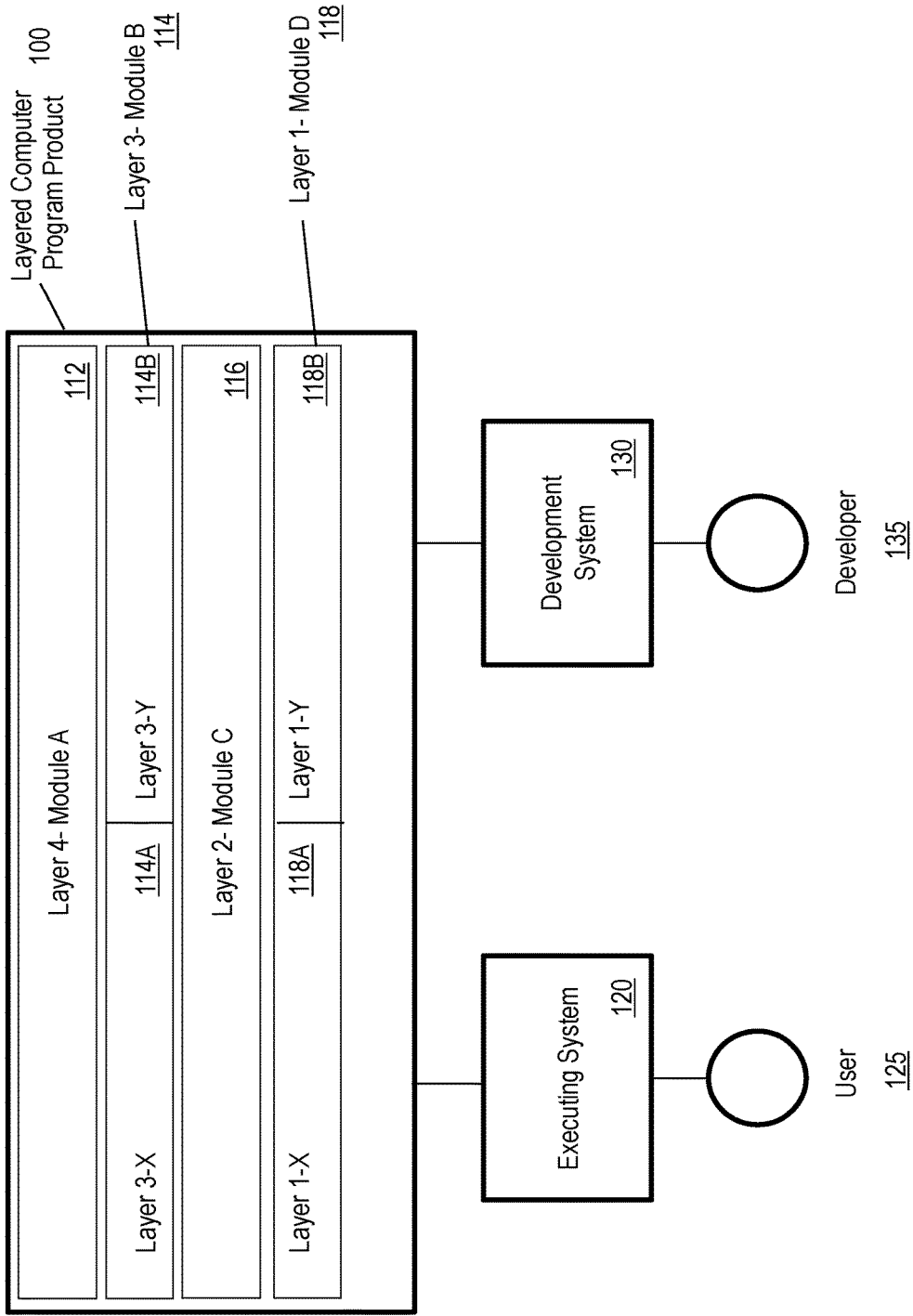
FIG. 1 illustrates a multilayered computer program product, in accordance with one or more embodiments.

For example, FIG. 1 illustrates a computer program product 100 with multiple layers 112, 114, 116, and 118. It should be noted that in other examples, the computer program product 100 may include a different number of layers than those illustrated by FIG. 1. Each of the layers 112-118 may correspond and be mapped to separate modules A, B, C, and D, respectively. Each module may be an individual product developed by one or more development teams respectively.

In the illustration, L4 is the top-most layer, having dependencies with L3, L2 and L1, L1 being the bottom-most layer having no dependencies. Further, a specific layer may include be further sub-layers, or nested layers, that are mapped to a different module, and hence a different development team. Thus, an execution scenario may have a "layer within a layer", which is referred to as a "Multi-level" or "Nested-level" multi-layer execution scenario.

A developer 135 may develop one or more of the layers 112-118 of the computer program product 100 using a development system 130. The development may include writing computer executable instructions for the one or more modules, testing the modules, debugging the modules, and any other phases of computer product development. In one or more examples, a user 125 may execute one or more scenarios of the computer program product 100 using an executing system 120. It should be noted that the executing system 120 and the development system 130 may be the same, identical, or different in different examples. In one or more examples, the computer program product 100 may include modules that are executed on a client-side device and/or on a server-side device.

Figure 2:
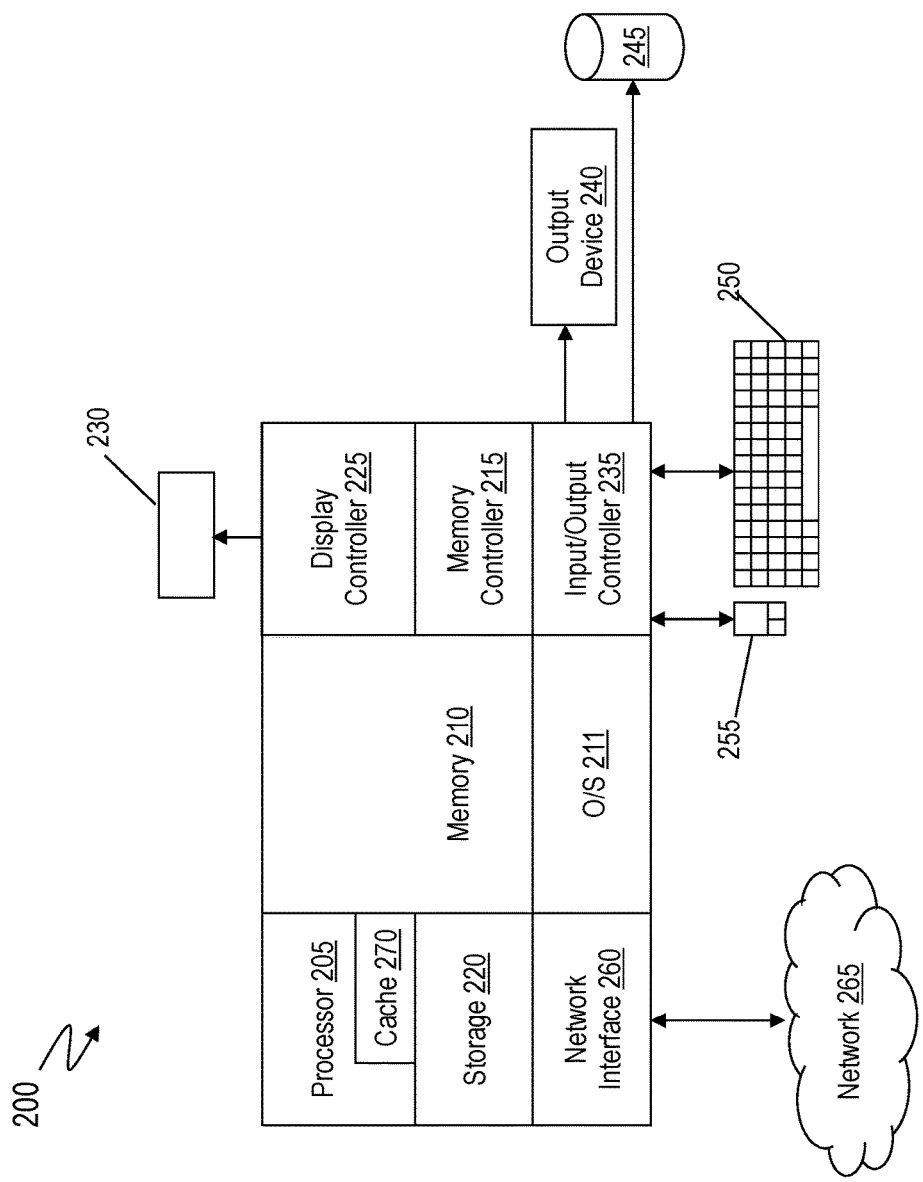
FIG. 2 illustrates an example computing system, in accordance with one or more embodiments.

The development system 130 and the executing system 120 may each include one or more computing systems, such as an example computing system 200 of FIG. 2. The computing system 200 may be a communication apparatus, such as a computer. For example, the computing system 200 may be a desktop computer, a tablet computer, a laptop computer, a phone, such as a smartphone, a server computer, or any other device that communicates via a network 265. The system 300 includes hardware, such as electronic circuitry.

The computing system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the computing system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The computing system 200 may further include a display controller 225 coupled to a user interface or display 230. In some embodiments, the display 230 may be an LCD screen. In other embodiments, the display 230 may include a plurality of LED status lights. In some embodiments, the computing system 200 may further include a network interface 260 for coupling to a network 265. The network 265 may be an IP-based network for communication between the computing system 200 and an external server, client and the like via a broadband connection. In an embodiment, the network 265 may be a satellite network. The network 265 transmits and receives data between the computing system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other.

The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
FIG. 3 illustrates an execution of an example scenario for the computer program product, in accordance with one or more embodiments.

FIG. 3 illustrates an execution of an example scenario for the computer program product 100. Consider that the computer program product 100 is an e-commerce product, where the layers 112-118 have separate development teams and are also individual modules A-D that are licensed separately. For the user 125, when using the computer program product 100 such layering is hidden when executing one or more scenarios. As used herein, a scenario is a collection of client side (user) and server side (executing system) steps. A step maps to a unit of action performed by the user 125. A step will have inputs and outputs, and the input to a step may be the outcome/output of a previous step.

For example, consider the following a sample scenario for the user 125 to use the computer program product 100. First, the user 125 registers himself/herself with the computer program product 100. Next, the user 125 logs into the computer program product 100. Then the user 125 reviews product catalog present online, selects 5 of them and compares the products with each other. Next, the user 125 then sorts the earlier selected products by category and then price. Then the user 125 selects a product to buy. Next, the user 125 is redirected to the payment gateway. Then the user 125 makes the payment. Finally, the user 125 logs off the computer program product 100.

In the above scenario, consider that Module A contains the code for logging in and out of the computer program product 100, Module B contains the code for product catalog display and various sorting functions and that Module C contains the code related to the payment processing. It is understood that the modules may be different in other examples.

The execution of the above example scenario is represented as an execution path 310 in FIG. 3, where the Steps 1-2 include execution of instructions in Module A, Steps 3-6 includes execution of instructions in Module B, Step 7 includes execution of instructions in Module C, and Step 8 includes execution of instructions in Module A. Further, consider that the user 125, while executing the scenario depicted by the execution path 310 experiences an exception thrown on the screen when trying to sort the product catalog by price in ascending order (step 4). The exception represents a defect in one or more portions of code in Module B.

As a result, a customer defect notification is sent to the development team for the computer program product 100 for analysis and rectification. In one or more examples, based on server logs, and product knowledge, the development team may identify that the sorting function in Module B is responsible for the functionality requested in Step 4, and thus that the defect may reside in a portion of code in Module B. Typically, the defect analysis is then assigned to the development team of Module B.

Because, each of the layers 112-118 may be a separate module developed by separate development teams, the development team of module B may not be able to execute the scenario represented by the execution path 310, which involves other modules of the computer program product 100. Accordingly, for debugging the module B, a scenario for the module B has to be identified, execution of which invokes the portion of the code of module B that includes the defect. Upon identifying such a scenario, the development team may execute the scenario with breakpoints in the code of the module B, and proceed to debugging module B.

The technical solutions described herein facilitate the development team to debug module B in the above case by automatically identifying one or more scenarios for invoking the defective portion of the code of module B. In one or more examples, the technical solutions identify a predetermined number of such scenarios. For example, the developer 135 may specify the predetermined number. Further, the technical solutions may automatically run a selected scenario until the breakpoint, facilitating the developer 135 to debug the code to fix the defect. Once the defect is fixed, the scenario used by the developer 135 may also be used during testing to confirm the fix in standalone runtime environment for the module B. For completeness, the fix is tested using a consolidated runtime environment that includes all the other modules of the computer program product 100.

For example, in the above example scenario, an equivalent scenario (where the problematic sorting function is used) may be one where an administrator logs in and sorts product sold in the past one month by price.

Figure 4:
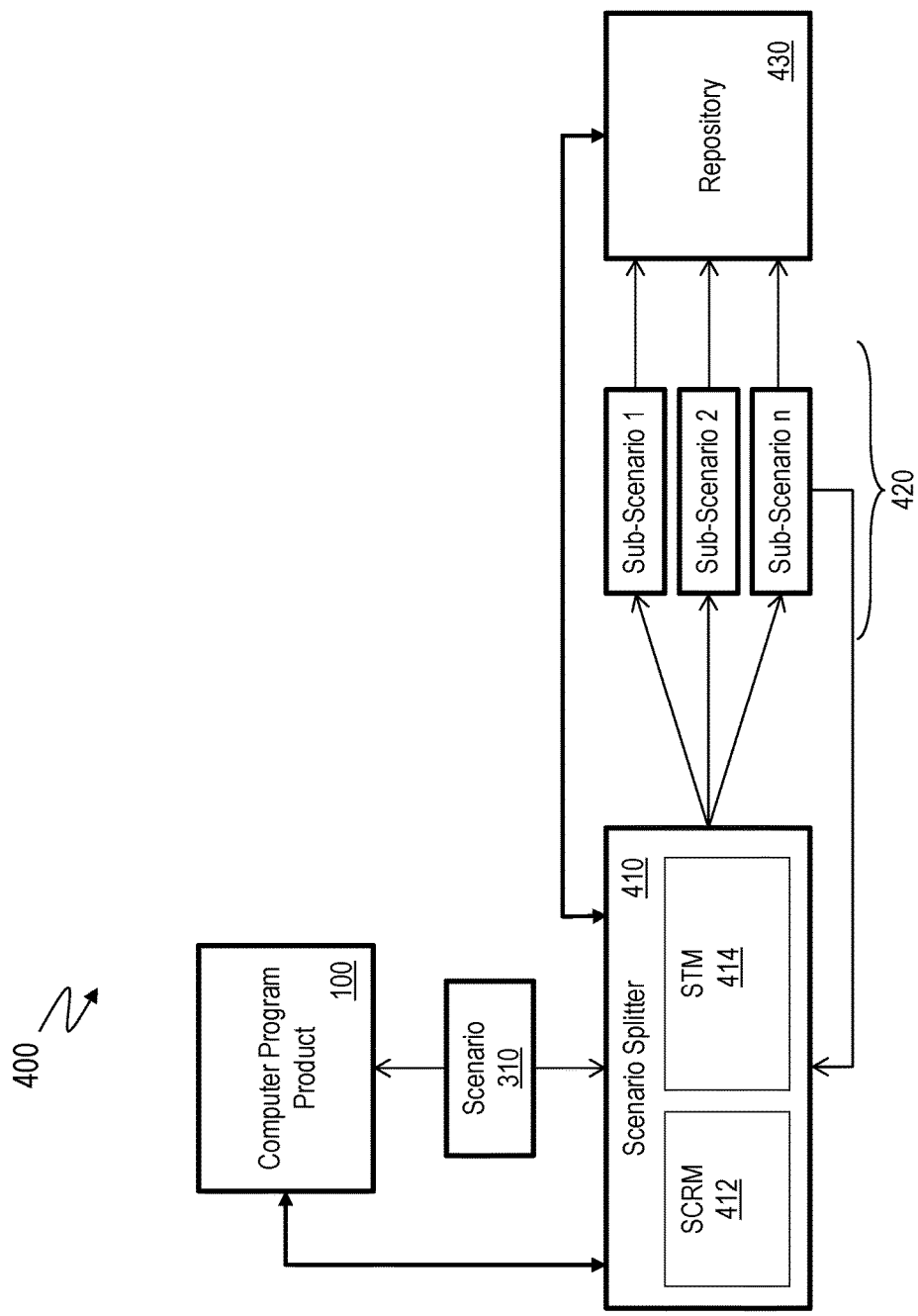
FIG. 4 illustrates an example system that facilitates debugging a computer program product, in accordance with one or more embodiments.

According to one or more embodiments, the technical solutions described herein, splits the execution of the scenario that experienced the defect, into sub-scenarios or segmented scenarios, so that the scenario in question, is translated or segmented into one or more scenarios for respective modules, and or for respective development teams. FIG. 4 illustrates an example system 400 that implements the technical solutions described herein. The system 400 includes a scenario splitter 410. The scenario splitter 410 may be part of the development system 130. For example, the scenario splitter 410 may be part of an IDE used by the developer 135, and or a separate system that communicates with the IDE.

The scenario splitter 410 has access to information about the computer program product 100. For example, the scenario splitter 410 has access to the composition of the multiple layers 112-118 of the computer program product 100. The scenario splitter 410 further has access to metadata of the computer executable instructions and modules of the computer program product 100. The metadata, for example, identifies one or more development teams responsible for the modules of the computer program product 100.

For example, the scenario splitter accesses such metadata from a repository 430. The repository 430 is a computer readable storage device. In one or more examples, the repository 430 stores the metadata of the computer program product 100 as a relational database or in any other format.

For example, FIG. 5 illustrates example metadata in the repository 430 that identifies respective development teams 510 for one or more modules 520 of an example computer program product 100. It should be noted that the metadata illustrated is from an example, and that in other examples the metadata may include other information, module names, function names, and the like. In one or more examples, the teams 510 may be further divided into sub-teams, which are responsible for specific portions of the code within the modules and/or layers. For example, a development team, such as 'provider management team' responsible for developing a 'provider management module' may include a 'service delivery team' that develops a sub-module 'service deliver' of the 'provider management module.' It should be noted that the above names of the modules and development teams are examples, and that other implementations of the technical solutions may include different modules, development teams, and splits than in the above description.

Figure 7:
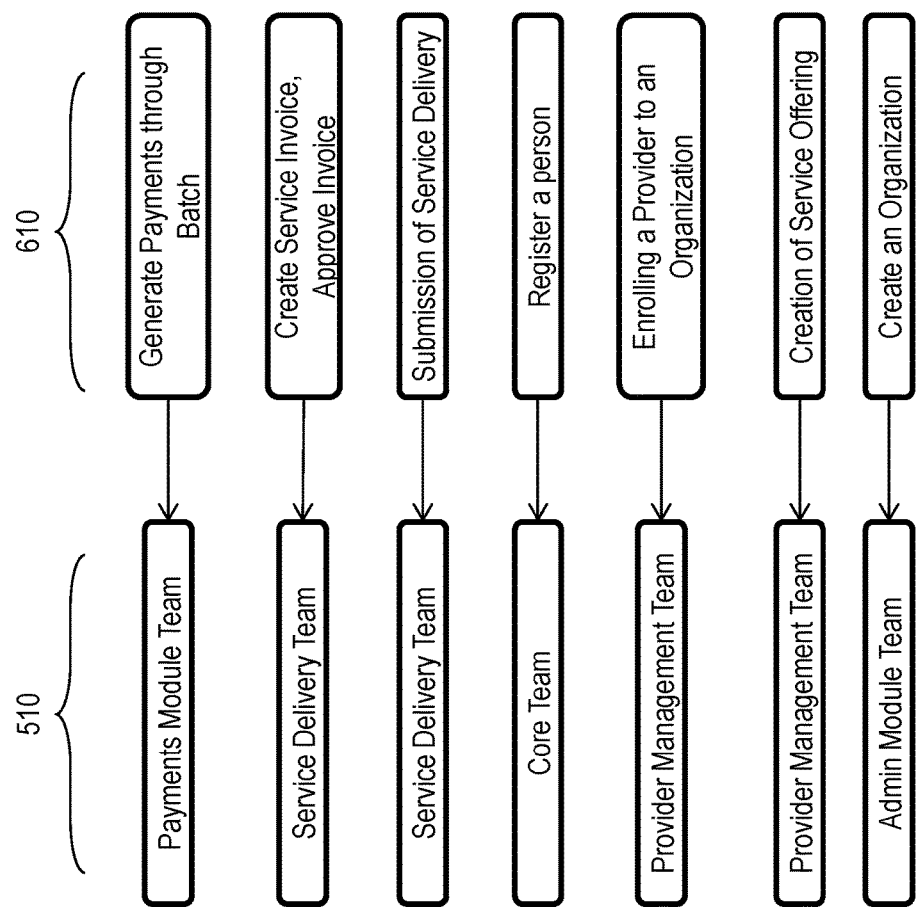
FIG. 7 illustrates an example mapping between one or more steps of execution scenarios and development teams, in accordance with one or more embodiments.

In one or more examples, the repository 430 further identifies one or more API function names 530 that are included in the one or more modules 520. Further yet, in one or more examples, as illustrated in FIG. 6, the repository 430 includes metadata that maps one or more steps 610 from execution scenarios with the module names 520 and the API functions 530. In one or more examples, based on the metadata, the scenario splitter identifies the development team associated with the one or more steps 610 from the execution scenarios. FIG. 7 illustrates an example mapping between the one or more steps 610 of execution scenarios and development teams 510 in the example for the example of FIGS. 5 and 6.

Referring back to FIG. 4, the scenario splitter 410 includes a Scenario Capture and Representation Module (SCRM) 412, and a Scenario Translation Module (STM) 414, among other components. The SCRM 412 facilitates capturing a scenario as well as providing a representation to a scenario. For example, the SCRM 412 represents the execution scenario 310 using extended markup language (XML) format, or any other computer readable format. For example, the representation stores the one or more steps 610 that are included in the execution scenario 310.

The STM 414 facilitates splitting the scenario representation that the SCRM 412 generates into one or more sub-scenarios 420. For example, the STM 414 takes, as an input, the scenario representation from the SCRM 412 and bifurcates the scenario into segmented sub-scenarios 420 that can be used independently by the respective development teams 510. The STM 414 provides, as output, multiple segmented scenarios, wherein each segmented scenario corresponds to a layer and a development team. In the case of a multi-level scenario, the STM 414 further bifurcates (or splits) a sub-scenario from the resultant multiple sub-scenarios 420. Accordingly, the STM 414 maps the levels of the sub-scenario to corresponding sub-teams. In one or more examples, the scenario splitter 410 stores the sub-scenarios in the repository 430.

Thus, the SCRM 412 facilitates capturing the scenario 310 that the user 125 runs. In one or more examples, the scenario 310 is captured in response to the user 125 experiencing a defect. Alternatively, or in addition, in one or more examples, a scenario that the computer program product 100 can execute is captured via the SCRM 412 to populate the repository 430. In yet another example, the SCRM 412 monitors the scenario 310 as the user 125 is executing the scenario 310, and in case the defect is experienced, the scenario 310 is input to the STM 414 to initiate the debugging.

The STM 414 translates the composite scenario 310 into one or more sub-scenarios 420. In one or more examples, the STM 414 splits the scenario 310 into the sub-scenarios 420, where each of the sub-scenarios can be run on a single layer of the computer program product 100 without any dependency on other layers. In one or more examples, the STM 414 receives, as input the scenario 310 that is to be split, and a specific layer of the computer program product 100 that is to be debugged. Accordingly, the STM 414 identifies a sub-scenario for the specific layer that was input.

For example, representation of the scenario 310 may differ from one layer to another, as the scenario cuts across the different layers in a layered software product/application. In such cases, the developer 135 instructs the scenario splitter 410 to provide a representation of the scenario 310 that is suitable for another layer. The representation of the scenario is fed as an input to the STM 414. Alternatively, or in addition, the developer 135 may not have to instruct the representation of the scenario 310. For example, after the application is launched, during execution of the scenario 310, which cross-cuts multiple layers of the application, the SCRM 412 captures the scenario 310 and a standard representation is provided to the scenario.

Thus, the scenario splitter 410 identifies each of the layers 112-118, and the inward and the outward dependencies across the layers 112-118. If the layers 112-118 correspond to separate modules and/or development teams, the scenario splitter 410 maps the scenario steps 610 to individual modules 520 and module components 530.

In one or more examples, based on the analysis of the metadata from the repository 430 and the layers spanned by the scenario 310, the scenario splitter 410, determines a number of the sub-scenarios 420 that the scenario 310 may be split into. The scenario splitter 410 may generate a list of the sub-scenarios determined and display the list to the developer 135. Further, the scenario splitter may determine and display a list that includes a number of possible scenarios from the bifurcated scenarios at all the levels 112-118 (multilevel bifurcation/splitting).

Accordingly, for the layered computer program product 100, which includes multiple and multilevel layers 112-118, where each layer maps to one or more development teams, for a given scenario, the scenario splitter 410 facilitates identification of segmented scenarios that are usable by multiple development teams. As described earlier, a reported defect (customer problem or an internal issue) containing a scenario on the layered computer program product 100 may be in one of the internal layers. Thus, using the a refined scenario specific to the layer where the defect is encountered, the scenario splitter 410 facilitates debugging the specific modules, and also verification/testing.

Figure 8:
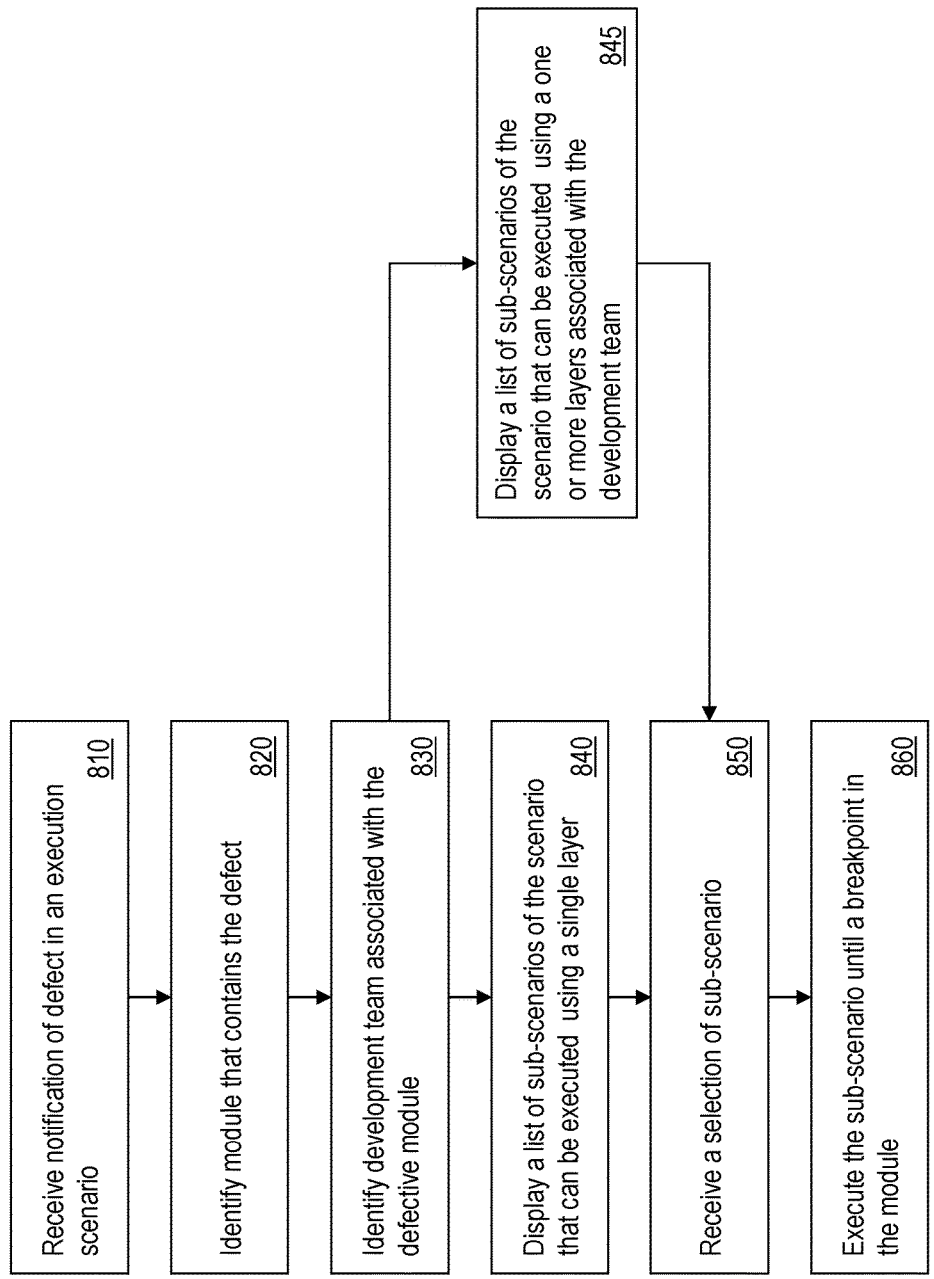
FIG. 8 illustrates a flowchart of an example method for facilitating debugging a multilayered multileveled computer program product, in accordance with one or more embodiments.

FIG. 8 illustrates a flowchart of an example method for facilitating debugging a multilayered multileveled computer program product 100. The method may be implemented by the system 400, for example, using the developer system 130. In one or more examples, the developer 135 uses the development system 130 for the executing the method. For example, the scenario splitter 410 receives notification of the defect in the execution scenario 310, as shown at 810. The scenario splitter 410 identifies the layer and/or module that contains the defect, as shown at 820. For example, the scenario splitter 410 determines the defective module based on the metadata of the computer program product 100 that the scenario splitter 410 accesses from the repository 430.

In one or more examples, the scenario splitter 410 further identifies the development team associated with the defective module, as shown at 830. The scenario splitter 410 determines the development team based on the metadata from the repository 430. Further yet, the scenario splitter 410 determines one or more sub-scenarios that the execution scenario 310 can be split into, and displays the list. For example, the scenario splitter 410 displays a list of sub-scenarios, where each of the sub-scenarios can be executed using a single layer (of the defective module) of the computer program product 100, as shown at 840. Alternatively, or in addition, the scenario splitter 410 generates and displays a list of sub-scenarios of the scenario that can be executed using one or more layers where each of the layers is associated with the development team (of the defective module), as shown at 845.

Further, the scenario splitter 410 receives a selection of a sub-scenario, from the displayed list, as shown at 850. For example, the developer that is debugging the defective module makes the selection using a user-interface of the system 400. The system 400 executes the selected sub-scenario until a breakpoint in the module, as shown at 860. For example, the developer 135 sets the breakpoint. Alternatively, or in addition, the system 400 sets the breakpoint automatically based on the input.

Further, the technical solutions provide mapping of the resultant sub-scenarios (a fragment from the composite scenario) to a development team using Code-2-Data (C2D) approach. Such mapping includes at least a two-step process, of splitting and translation. Splitting includes determining one or more sub-scenarios of the composite execution scenario. The translation includes aligning the one or more sub-scenarios to a specific development teams. Further, the technical solutions determine prerequisites for executing the one or more sub-scenarios corresponding to a specific development team. Accordingly, the technical solutions facilitate the development team to debug the module/layer that the development team is responsible for by executing the sub-scenario independent of other layers of the computer program product.

For example, the C2D approach ensures that prerequisites for executing one or more of the identified sub-scenarios are met. The C2D approach facilitates meeting the prerequisites by identifying the prerequisites, and further converting the sub-scenario into an independent scenario that can be executed without dependency on other sub-scenario/layers from the computer program product 100.

Figure 9:
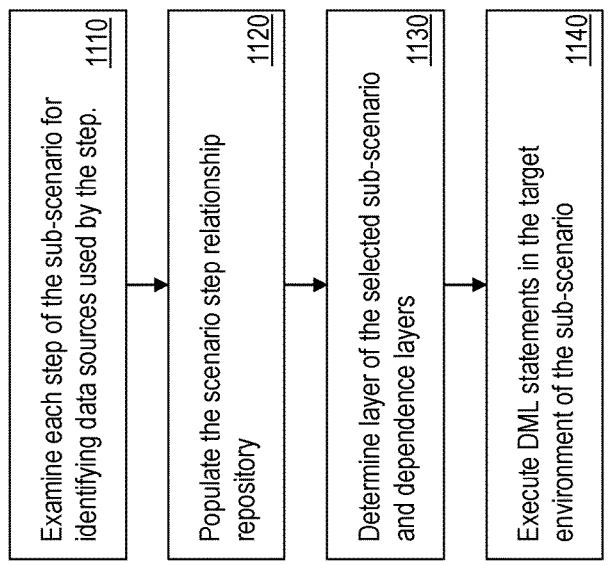
FIG. 9 illustrates a flowchart of an example method for determining prerequisites for a sub-scenario, according to one or more embodiments.

FIG. 9 illustrates a flowchart for a method of converting a sub-scenario into an independent scenario using code-to-data, according to one or more embodiments. In one or more examples, the scenario splitter 410 executes the method.

An example execution of the above methods is described further based on the example execution scenario provided in Table 1.

TABLE 1

Step 1: Register Person
Step 2: Creation of 'first case' for the person
Step 3: Creation of evidence for the 'first case'
Step 4: Creation of 'second case' for the person
Step 5: Creation of evidence for the 'second case'
Step 6: A scenario that triggers sharing of the evidence from 'first person' to 'second person' by calling the appropriate API
Step 7: Satisfying proof requirements as mandated for the given program Further, the metadata associated with the computer program product 100 for this example scenario is illustrated in FIG. 10. The metadata maps the development teams 510, modules 520, API 530, and data model contributors 910. For example, the data model 910 refers to the list of entities that are applicable and that are owned by an application team. For example, from the metadata (FIG. 5, 6), the list of entities that form the data model contributors can be derived.

Referring to the flowchart in FIG. 9, in one or more examples, a step from the identified sub-scenario is intercepted and examined, as shown at 910. The step from the scenario is examined to determine target and/or source data repositories being used by the step. For example, the data repositories may be a database, a file, and the like. In one or more examples, the data repositories being used by the step are identified using one or more API to identify DML statements in, or associated with the code of the computer program product 100. For example, FIG. 10 depicts an example scenario repository that identifies layers from the compute program product 100 and the corresponding packages, project teams, and other aspects.

In one or more examples, the scenario splitter creates and/or uses a scenario step relationship repository (SSRR) to map the step from the sub-scenario with the data repositories, as shown at 920. The SSRR may be part of the repository 430, and or a separate data repository that is accessible by the scenario splitter 410. The SSRR includes information such as a reference to the scenario repository, the sub-scenario step, and the data repository(ies) being used. FIG. 11 depicts an example SSRR for the above example of FIG. 10. Additionally, FIG. 10 illustrates further metadata mapping for this case the scenario steps 610 with the remaining metadata. In one or more examples, the data model contributors 910 are mapped with one or more data model language (DML) statements 1010.

Further, the scenario splitter 410, in response to receiving a selection of the sub-scenario, identifies a layer of the computer program product 100 at which the sub-scenario, as shown at 1130. The splitter 410 further identifies the layers that are below or on which the layer of the scenario depends on, as shown at 1130. The DML statements from the computer program product 100 are then executed in the target project environment of the sub-scenario, using the SSRR, as shown at 1140.

Further yet, consider that the defect has been identified in the "Evidence Sharing API" (shown in bold in FIG. 10). Consequently, the corresponding development team (Evidence Broker Team) would unit test the functionality of the layer in which the defect is identified. In this case, the level of the defect is 2. Accordingly, all the data-contributors 910, all the steps 610, at the levels 2, 1, and 0 are considered. Further, the scenario splitter 410 ensures that the ordering of the steps in the execution scenario (of Table 1) is maintained, for example, Register Person, Creation of 'first case' for the person, Creation of evidence for the 'first case', Creation of 'second case' for the person, and Creation of evidence for the 'second case'.

The system 400 further identifies the corresponding DMLs for invoking the defective code. In this case, the corresponding DMLs include PERSON, CONCERNROLE, CASEHEADER, INTEGRATEDCASE, EVIDENCEDEFINITION, DYNAMICEVIDENCEDEFINITION, EVIDENCEDESCRIPTOR.

Thus, the system 400 determines the data dependencies for executing a sub-scenario for invoking the defective code, without depending on other layers of the computer program product. Here, the system 400 does not explicitly have to refer to data definition language (DDL) or foreign key (FK) dependencies, because the mapping based on the metadata incorporates such dependencies. Accordingly, the system 400 identifies the data dependencies for execution of the sub-scenario more efficiently. Further, it should be noted that in this example scenario, the "Verification data" that is at level 3 is not considered.

Accordingly, in this example, the Evidence Broker team for the independent execution of the "Evidence Sharing API" can run all the dependent DMLs, for debugging and testing the identified defect.

Thus, the technical solutions described herein facilitate debugging a computer program product, such as a software, by identifying a multi-level sub-scenarios from a composite execution scenario. Further, the technical solutions provide mapping of the resultant sub-scenarios (a fragment from the composite scenario) to a development team using Code-2-Data (C2D) approach. Such mapping includes at least a two-step process, of splitting and translation. Splitting includes determining one or more sub-scenarios of the composite execution scenario. The translation includes aligning the one or more sub-scenarios to a specific development teams. Further, the technical solutions determine prerequisites for executing the one or more sub-scenarios corresponding to a specific development team. Accordingly, the technical solutions facilitate the development team to debug the module/layer that the development team is responsible for by executing the sub-scenario independent of other layers of the computer program product.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for debugging a computer program product, the method comprising:
  receiving an identifier of a portion of code from a first module of the computer program product, wherein the portion of code contains a defect, the computer program product comprising a plurality of modules, each module being associated with a development team identifier that indicates which development team developed the module;
  determining, based on the development team identifier, and displaying a list of execution scenarios that invoke the portion of code from the first module, an execution scenario in the list invokes computer code only from a set of modules that are associated with the development team identifier of the first module; and
  in response to receipt of a selection of a first execution scenario from the list of execution scenarios, executing the computer program product according to the first execution scenario by executing only the computer code from the set of modules that are associated with the development team identifier of the first module.

2. The method of claim 1, further comprising:
  receiving a notification of the defect during execution of the computer program product; and
  identifying that the portion of code contains the defect.

3. The method of claim 1, wherein the defect occurred during execution of a second execution scenario.

4. The method of claim 3, further comprising:
  generating the list of execution scenarios by splitting the second execution scenario into multiple sub-scenarios that are added to the list.

5. The method of claim 4, wherein execution of the second execution scenario includes invoking at least the first module and a second module, and execution each of the sub-scenarios includes invoking only the first module.

6. The method of claim 4, wherein the second execution scenario is split into a predetermined number of sub-scenarios.

7. The method of claim 5, wherein execution of each of the sub-scenarios invokes the portion of the code that contains the defect.

8. A system for debugging a computer program product, the system comprising:
  a memory; and
  a processor coupled with the memory, the processor configured to:
    receive an identifier of a portion of code from a first module of the computer program product, wherein the portion of code contains a defect, the computer program product comprising a plurality of modules, each module being associated with a development team identifier that indicates which development team developed the module;
    determine, based on the development team identifier, a list of execution scenarios, an execution scenario in the list invokes computer code only from a set of modules that are associated with the development team identifier of the first module;
    display the list of execution scenarios for user selection; and
    in response to receipt of a selection of a first execution scenario from the list of execution scenarios, execute the computer program product according to the first execution scenario.

9. The system of claim 8, the processor further configured to:
  receive a notification of the defect during execution of the computer program product; and
  identify that the portion of code contains the defect.

10. The system of claim 8, wherein the defect occurred during execution of a second execution scenario.

11. The system of claim 10, the processor further configured to:
  generate the list of execution scenarios by splitting the second execution scenario into multiple sub-scenarios that are added to the list.

12. The system of claim 11, wherein execution of the second execution scenario includes invoking at least the first module and a second module, and execution each of the sub-scenarios includes invoking only the first module.

13. The system of claim 11, wherein the second execution scenario is split into a predetermined number of sub-scenarios.

14. The system of claim 12, wherein execution of each of the sub-scenarios invokes the portion of the code that contains the defect.

15. A computer program product for debugging a software, the computer program product comprising a computer readable storage medium, the computer readable storage medium comprising computer executable instructions, wherein the computer readable storage medium comprises instructions to:
   receive an identifier of a portion of code from a first module of the software, wherein the portion of code contains a defect, the computer program product comprising a plurality of modules, each module being associated with a development team identifier that indicates which development team developed the module;
   determine, based on the development team identifier, a list of execution scenarios, an execution scenario in the list invokes computer code only from a set of modules that are associated with the development team identifier of the first module;
   display the list of execution scenarios for user selection; and
   in response to receipt of a selection of a first execution scenario from the list of execution scenarios, execute the software according to the first execution scenario by executing only the computer code from the set of modules that are associated with the development team identifier of the first module.

16. The computer program product of claim 15, wherein the defect occurred during execution of a second execution scenario.

17. The computer program product of claim 16, the computer readable storage medium further comprises instructions to:
   generate the list of execution scenarios by splitting the second execution scenario into multiple sub-scenarios that are added to the list.

18. The computer program product of claim 17, wherein execution of the second execution scenario includes invoking at least the first module and a second module, and execution each of the sub-scenarios includes invoking only the first module.

19. The computer program product of claim 18, wherein execution of each of the sub-scenarios invokes the portion of the code that contains the defect.

20. The computer program product of claim 19, wherein the second execution scenario is split into a predetermined number of sub-scenarios.

* * * * *